United States Patent [19]

Widmer

[11] 3,875,026

[45] Apr. 1, 1975

[54] METHOD FOR PRODUCING ALUMINUM HOLOGRAPHIC MASTERS

[75] Inventor: Roland Werner Widmer, Rumlang, Switzerland

[73] Assignee: RCA Corporation, New York, N.Y.

[22] Filed: May 22, 1974

[21] Appl. No.: 472,293

[52] U.S. Cl. .................................... 204/27, 204/23

[51] Int. Cl. .......................... C23b 5/00, C23b 5/58

[58] Field of Search ................ 204/23, 27, 38 A, 42

[56] References Cited

UNITED STATES PATENTS

| | | | |
|---|---|---|---|
| 3,290,233 | 12/1966 | Hay et al. | 204/38 R |
| 3,585,113 | 6/1971 | Morris, Jr. | 204/6 |
| 3,666,638 | 5/1972 | Harris et al. | 204/42 |
| 3,733,258 | 5/1973 | Hanak et al. | 204/192 |

*Primary Examiner*—T. M. Tufariello
*Attorney, Agent, or Firm*—Edward J. Norton; George J. Seligsohn

[57] ABSTRACT

A master for replicating surface relief holograms is prepared by depositing a photoresist on the surface of an amorphous aluminum substrate, exposing the photoresist to an interference pattern, developing the photoresist to record the interference pattern as a surface relief pattern, transferring the surface relief pattern onto the surface of the aluminum substrate, removing the remaining photoresist, and anodizing the aluminum surface. This method is particularly useful in making masters for surface relief focused image holograms whose surface dimensions are in the order of one micron or less.

9 Claims, 3 Drawing Figures

METHOD FOR PRODUCING ALUMINUM HOLOGRAPHIC MASTERS

FIELD OF THE INVENTION

The present invention relates to producing a master for a surface relief hologram. More particularly, the present invention relates to a method for producing a master for a surface relief hologram in aluminum.

BACKGROUND OF THE INVENTION

The conventional technique for forming a master of a surface relief hologram involves depositing a film of metal or hardenable material on the surface of a photoresist on which the surface relief hologram is recorded, separating the film from the photoresist surface, and backing the film with a hard material for support. U.S. Pat. No. 3,565,978 describes such a technique. Since the resolution for the typical surface relief hologram is on the order of 1 micron, great care must be exercised in separating the film from the photoresist to prevent damage to the surface relief pattern embossed on the film.

To be useful for embossing a holographic surface relief pattern it is necessary that the master material be hard and well adherent, have an extremely fine structure, e.g., an amorphous material, and be easily etchable. Most hard metals recrystallize very easily when deposited as a thin film on an amorphous substrate. Since the crystallite size of most recrystallized metals is generally of the order required for resolution of a holographic surface relief pattern it is not practical to use such metals for replication of a surface relief pattern. A soft, amorphous metal is not a good master material since it can only be used for a limited number of pressings. Thus, it is desirable to fine a hard, easily etchable master material which does not require the care and number of processing steps used in conventional master forming techniques.

SUMMARY OF THE INVENTION

A master for replicating a surface relief hologram is produced by depositing a photoresist on an aluminum substrate, exposing the photoresist to an interference pattern, developing the interference pattern into a surface relief pattern whose surface dimensions are on the order of 1 micron or less, transferring the surface relief pattern into the surface of the aluminum substrate, removing the remaining photoresist, and anodizing the aluminum surface.

DESCRIPTION OF THE PREFERRED EMBODIMENT

Aluminum can be easily evaporated at a very high rate and, therefore, can be deposited in an amorphous form with very small particle size. Also aluminum is easily etchable with weak acids or bases compatible with photoresist development techniques. The major disadvantage with aluminum is its softness, i.e., a 2 to 2.9 hardness on Moh's scale.

The present invention utilizes aluminum's superior qualities, i.e., etchability and amorphousness, and overcomes its major disadvantae, i.e., softness, by anodization of the aluminum surface after the surface relief pattern has been formed in the surface of the aluminum. The relief pattern etched into the aluminum remains essentially unchanged apart from a small thickness variation due to volume changes during anodization which can be allowed for before the anodization stage.

Figure 1:
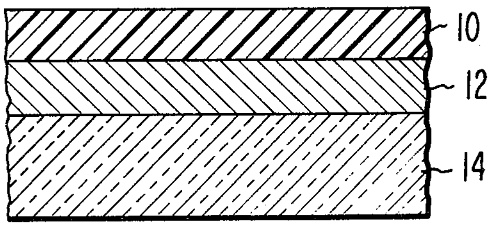
FIGS. 1-3, inclusive, illustrate the sequence for forming an anodized aluminum master for replicating a hologram.
Figure 2:
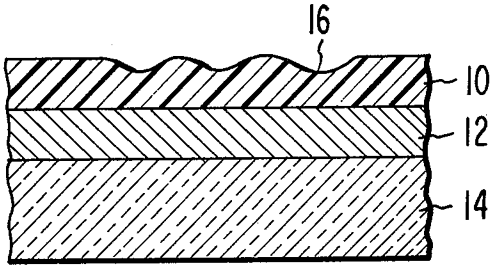
Figure 3:
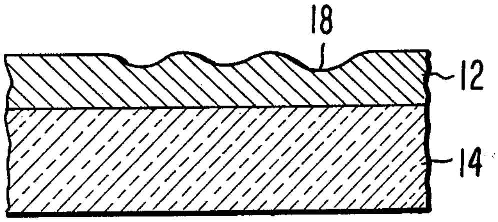

The steps for forming a master for replicating a surface relief hologram in an aluminum surface, as illustrated by FIGS. 1-3, are:

1. Referring now to FIG. 1, depositing a photoresist 10, e.g., a Shipley 1350 positive photoresist available from the Shipley Co., on top of an aluminum substrate 12 which itself may have been coated on a substrate 14;
2. Exposing the photoresist 10 to an interference pattern, e.g., a focused image interference pattern;
3. Referring now to FIG. 2, developing the interference pattern into a surface relief pattern 16 recorded on the photoresist 10;
4. Referring now to FIG. 3, transferring the surface relief pattern 16 recorded on the photoresist onto the surface 18 of the aluminum 12;
5. Removing any remaining photoresist 10; and
6. Anodizing the aluminum surface 18.

The surface relief pattern may be linearly etched into the aluminum surface by sputter-etching as described in U.S. Pat. No. 3,733,258, issued May 15, 1973 or by chemical etching as described in copending application "Generation of Permanent Holograms and Relief Patterns in Durable Media" by M. T. Gale and J. Kane Ser. No. 472,350 filed concurrently with this application. Also, a pulse width modulated surface relief structure may be developed in the aluminum surface using techniques described in copending application "Method for Producing Pulse Width Modulated Focused Image Holograms" by M. T. Gale and A. H. Firester Ser. No. 472,436 also filed concurrently with this application. The aluminum may be etched in a solution of 90 ml $H_3PO_4$, 5 ml $HNO_3$ and 10 ml $H_2O$ at 40°C. Contact in this solution for about 30 seconds with slight agitation is sufficient to etch a suitable two-level pulse width modulated diffraction grating in an aluminum surface. It is important that the aluminum not be etched completely through to the underlying substrate. Otherwise, the pattern cannot be anodized by a wet chemical method because there is no metal left on the lower side of the pattern to carry the anodizing current. The aluminum also can be anodized thermally or in an oxygen plasma.

The present invention may be utilized in the following manner; however, it is understood that the invention is not limited to the details described therein.

A 1 μm thick film of aluminum is evaporated onto a glass plate. The aluminum film is then coated with a 4,000 A. thick film of Shipley AZ 1350 photoresist available from the Shipley Co. The photoresist is baked at about 75°C. for about 1 hour. The photoresist is exposed to a holographic interference pattern from a He-Cd laser. The wavelength of the laser is 4,416 A.; the optimum exposure is about 0.1 joule/cm$^2$. The photoresist is developed in a Shipley AZ 303 developer available from the Shipley Co. at 1:8 dilution in distilled water until all the resist is removed. The total development time is about 3 to 4 minutes. The aluminum film is etched by the Shipley AZ 303 developer at a rate comparable to the rate at which the developer developed, i.e., removed, the photoresist since the Shipley AZ 303 developer is based upon a sodium hydroxide solution which will etch aluminum. The surface relief pattern on the photoresist is linearly transferred onto the aluminum surface as a result of this technique. The plate is rinsed in water and dried. The etched aluminum film on the glass plate is now connected to the anode of a 12V dc power supply. The cathode is connected to a lead plate. Both plates are immersed in a beaker containing 0.05 M sulfuric acid and the anodization carried out at room temperature with slight agitation. After about 1½ minutes the aluminum surface relief pattern is anodized and after about 5 minutes the unexposed aluminum is anodized.

The anodized aluminum surface has a hardness of about 5.5 on the Moh's scale and can be used to directly replicate the surface relief pattern into a thermoplastic such as polyvinyl chloride. In the case of polyvinyl chloride the optimum embossing temperature is about 90°C.

What is claimed is:

1. A method for forming a master of a surface relief pattern comprising:

a. coating a photoresist on an aluminum substrate;

b. exposing the photoresist to an interference pattern;

c. developing a surface relief pattern which records said interference pattern on the surface of said photoresist;

d. transferring said interference pattern onto the surface of the aluminum substrate;

e. removing said photoresist; and f. anodizing said aluminum surface.

2. The method of claim 1 wherein the surface and depth dimensions of said surface relief pattern are about one micron or less.

3. The method of claim 1 wherein said transfer is made by sputter-etching.

4. The method of claim 1 wherein said transfer is made by chemical etching.

5. The method of claim 1 wherein interference pattern is a focused image interference pattern.

6. The method of claim 1 wherein said anodizing is by electrochemical anodization.

7. The method of claim 1 wherein said anodizing is by thermal anodization.

8. The method of claim 1 wherein said anodizing takes place in an oxygen plasma.

9. A master of a surface relief pattern formed by the process of claim 1.

* * * * *